(12) United States Patent
Blichmann

(10) Patent No.: US 9,469,830 B1
(45) Date of Patent: Oct. 18, 2016

(54) RECIRCULATION INFUSION MASH SYSTEM

(71) Applicant: John Richard Blichmann, Lafayette, IN (US)

(72) Inventor: John Richard Blichmann, Lafayette, IN (US)

( * ) Notice: Subject to any disclaimer, the term of this patent is extended or adjusted under 35 U.S.C. 154(b) by 0 days.

(21) Appl. No.: 14/624,934

(22) Filed: Feb. 18, 2015

Related U.S. Application Data

(63) Continuation of application No. 13/987,078, filed on Jul. 2, 2013, now Pat. No. 8,993,273.

(51) Int. Cl.
   *C12C 7/04* (2006.01)

(52) U.S. Cl.
   CPC .................................. *C12C 7/042* (2013.01)

(58) Field of Classification Search
   CPC ....................................................... C12C 7/04
   See application file for complete search history.

(56) References Cited

U.S. PATENT DOCUMENTS

| 4,494,451 A | 1/1985 | Hickey |
| 4,653,388 A | 3/1987 | Wilkinson |

*Primary Examiner* — Rosanne Kosson

(57) ABSTRACT

A process of mashing grain into fermentable sugar wherein two pots are used in the process. A first pot and a second pot is partially filled with water. Heat is added to the first pot. Heat is transferred to the second pot by transferring the water from the first pot to the second pot at a preestablished rate. Grain is added to the second pot which in conjunction with the water forms a wort. The wort is drained from the second pot to the first pot.

20 Claims, 8 Drawing Sheets

Prior Art

Prior Art

RECIRCULATION INFUSION MASH SYSTEM

CROSS REFERENCE TO RELATED APPLICATIONS

This application claims the benefit of U.S. patent application Ser. No. 13/987,078 filed Jul. 2, 2013, the entire contents of which are hereby incorporated by reference.

TECHNICAL FIELD

This invention relates generally to a system or a process for mashing grain into a fermentable sugar.

BACKGROUND

It is well known in the art to use a 3 tier system to produce beer wort from crushed grains. A typical system utilizes a first vessel for boiling the finished wort. A second vessel called a mash and lauter tun for mashing the grains which will contain a false bottom or a slotted pipe manifold or a simple screen on the drain fitting. A third vessel called a hot liquor tank (HLT) is simply a tank for heating the rinse water for the spent grains. Although uncommon, sometimes a combined mash lauter tun is not used and the wort is transferred from the mash tun to the lauter tun for wort (unfermented beer) separation. To prepare the wort, the mash tun is filled with a preestablished quantity of water and heated to a preestablished temperature. Typically, a water to grist ratio of 1 to 2 quarts of water per pound of grain is used. The crushed grains are then placed in the tun and allowed to rest for a period of time which allows the starches in the grains to convert to sugars. At the same time, the HLT is filled and heated to a preestablished temperature. After the mash rest is completed, the contents of the mash tun are drained into a grant (a smaller pot) and returned to the top of the mash. This is repeated until the wort runs clear, and in the art is called a vorlauf or simply "setting the mash bed". This step will allow the mash to act as the filter media for the wort, thus, clarifying the wort. The clarified wort is then directed to the brew kettle. Simultaneously, a sparging process is begun by draining the HLT water into the top of the mash tun thereby rinsing the remaining sugars out of the grains and into the brew kettle. For best efficiency it is known in the art that this process should take about an hour to perform. A rate much faster than this and extraction efficiency suffers. After the sparging process, a clear wort is drained into the brew kettle since nearly all sugars have been removed from the mashed grains. As a result, traditional 3 tier systems product a very clear wort free of undesirable proteins and do so with excellent efficiencies. Their main drawback is the extended amount of time needed to prepare the wort due to the clarification and sparging process. Additionally, brewers have a difficult time controlling temperatures in the mash tun to produce the desired wort sugar consistency. Therefore it is quite common to utilize a Recirculation Infusion Mash System (RIMS) in the mashing process for the preparation of beer wort which is well known in the art. A common variant of the traditional RIMS is to use a heat exchanger instead of directly applying heat. These systems are referred to as "Heat Exchanger Recirculation Mash Systems" or HERMS. Such systems utilize a mash tun which contains a false bottom or other filter system (screens, slotted pipe manifold to name a few). The wort is drawn off the bottom of the pot, then directly heated via an electric, gas or other heat sources and returned to the top of the mash. It is common to recirculate via a pump but gravity draining into a second container and manually returning the wort to the top of the mash is also common. HERMS systems indirectly heat the wort through a heat exchanger usually immersed to the hot liquor tank. This reduces the chances of scorching the wort which adds undesirable flavor and colors to the finished wort. When the preestablished rest temperature is reached the heater (or pump in the case of a HERMS system) is turned off. Also very common are numerous electronic control systems to automatically turn the pumps/heat on and off to maintaining a preestablished rest temperature, typically employing a temperature sensor and a meter, PID, PLC, switch or similar to turn on/off modulate the heat source to maintain preestablished temperature and, if desired, ramp to numerous temperatures through out the mashing process.

The "Brew in a Bag" (BIAB) method is also well known in the art to produce wort in an all grain system. The BIAB system are quite simple and are becoming more popular in the industry because of their ease of use, although they do have some deficiencies. Namely, lack of wort clarification and poor efficiency. In lieu of a pot and a false bottom. A porous bag filled with crushed grains is placed in a pot of heated water of a predetermined volume and allowed to steep for a preestablished time. Typical water to grist ratio's are 2 3 quarts per pound of grain. Noting, higher ratios may not be achieved since the grains consume a significant portion of the total volume of the mash and is limited by the size of the pot. This would require an oversized pot with a less than optimum size for good boil characteristics once the spent grains are removed. After this time has passed the bag is lifted and allowed to drain back into the pot. While the advantages of simplicity, low cost, and speed are clear and obvious advantages, there are equally clear disadvantages to the BIAB system. Firstly, the elimination of recirculation precludes the clarification of the wort from the grains acting as a filter media and the resulting worts are significantly cloudier than those of 3 tier type systems and contain undesirable proteins and particulate matter which negatively impact beer quality, Secondly, it is not possible to readily perform a step mash (resting at various temperatures) since the bag impedes the heating action and leads to scorching. This precludes the brewer from making certain beer styles since they require multiple temperature rests. Therefore only beers capable of being brewed in a simple step infusion mash are suitable of being brewed in a BIAB system. Thirdly, significant quantities of wort sugars remain in the spent grains since the sparging process described above is eliminated, and the wort is more concentrated than the present invention. Therefore cloudy wort with significantly lower efficiency (more grain is required to produce the finished beer) are produced with BIAB systems. And lastly, the brewer must lift the hot bag of spent grains above the brew kettle to drain out the contained wort. This a cumbersome, heavy and a somewhat dangerous operation.

The present invention is directed to overcome one or more of the problems as set forth above.

SUMMARY OF THE INVENTION

In one aspect of the invention a two pot process of mashing grain into fermentable sugar is comprised of the following steps: placing a first preestablished quantity of water into a first pot; placing a second preestablished quantity of water into a second pot; applying a preestablished quantity of heat to the first pot; transferring at least a portion of the heated preestablished quantity of water within the first pot into the second pot, resulting in heating the preestablished quantity of water within the second pot; adding the grain to the second pot not being heated; circulating the preestablished quantity of water from the first pot being heated to the second pot forming a wort; controlling the circulating step defining a preestablished flow rate of the wort; draining the wort from the second pot not being heated into the first pot; and removing the grain from the second pot not being heated.

In another aspect of the invention a two pot process of mashing grain into fermentable sugars includes a first pot being a mash tun and a second pot being a boil kettle; the mash tun being elevationally positioned above the boil kettle; the boil kettle having a lid positioned in contacting relationship and being positioned in an open top of the boil kettle; the mash tun being elevationally positioned above the boil kettle; the boil kettle having a lid positioned in contacting relationship and being positioned in an open top of the boil kettle; the mash tun being in contacting relationship with the lid; a drain line communicating from the mash tun near the closed bottom of the mash tun into the boil kettle; a flow control mechanism being positioned in the drain line; and a heating unit transferring heat to the boil kettle.

In another aspect of the invention a two pot process of mashing grain into fermentable sugars comprises the steps of: adding water to each of the two pots; heating one of the two pots with a heater; circulating the water being heated in the one of the two pots to the other of the two pots using a pump; adding a grain to the one of the two pots not being heated by the heater; forming a wort; circulating the wort between the two pots; controlling a flow rate of the step circulating the wort using a flow control mechanism; and draining the wort into the one of the two pots being heated.

DETAILED DESCRIPTION

Figure 1:
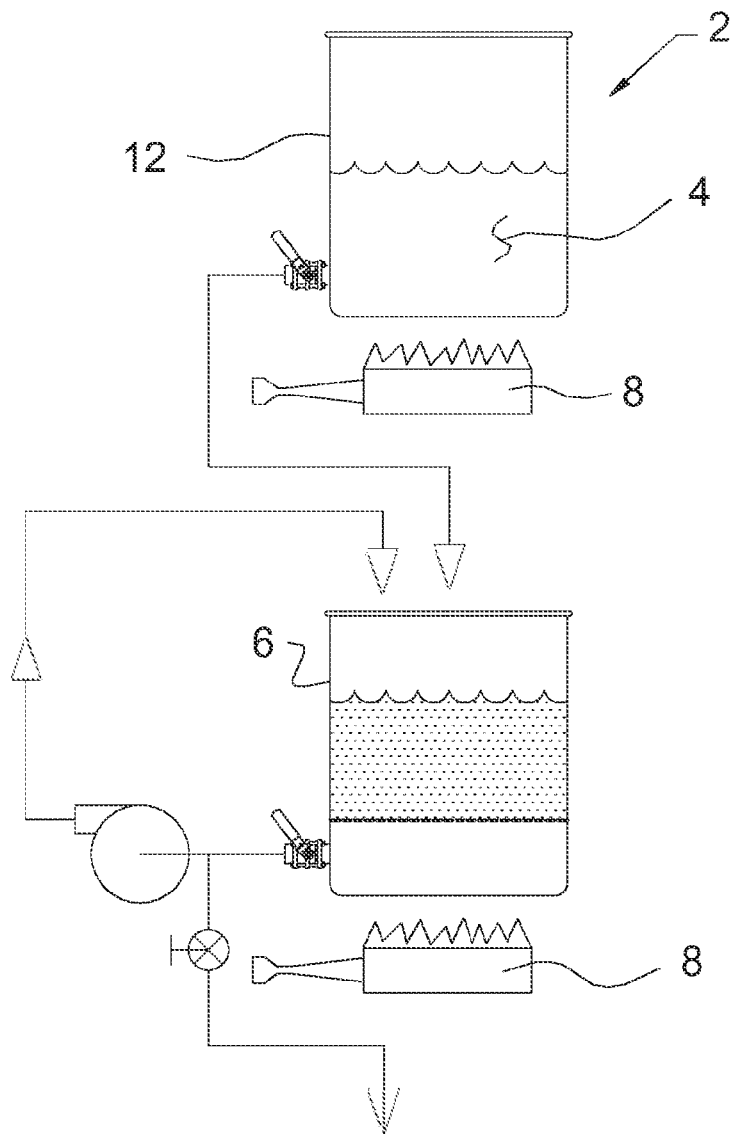
FIG. 1 is a prior art schematic view of the 3 tier system of converting grain into wort.
Figure 1:
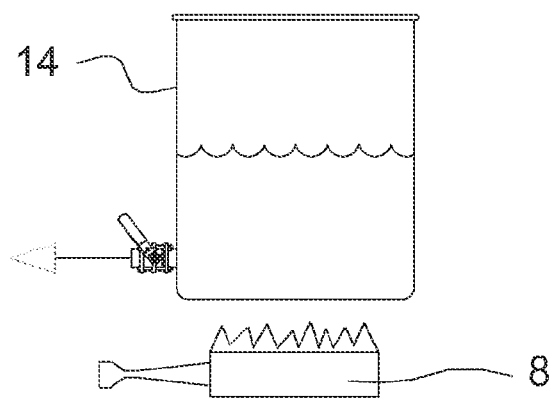

In the prior art schematic of FIG. 1, a conventional 3 tier system 2 is shown. The 3 tier setup includes a preestablished amount of water 4 placed in a first pot, a mash pot 6 and heated by a heating unit 8 to a preestablished temperature. Grain 10 is added at the preestablished temperature and the preestablished temperature is stabilize. Separately, a preestablished amount of sparge (rinse) water 4 is added to a second pot, hot liquor tank (HLT) 12. The hot liquor tank 12 is heated to a preestablished temperature and held at that temperature until needed for sparging at the end of a mashing process 24 within a third pot 14. Thus, the 3 tier system uses three (3) pots 6, 12, 14.

In the prior art 3 tier system of FIG. 1, a predetermined volume of water 4 is placed in the hot liquor tank 12 and a remainder of the water 4 is placed in the mash pot 6. In general, about half of the total water 4 needed for the brew is added to each pot 12, 6. It is recognized that this ratio can vary significantly without effecting the operation or outcome of the beer. Typically overall water 4 to grain 10 ratio will be 1 2 quarts of water per pound of grain 10 so the wort is much more concentrated than the BIAB or the present invention. One pot 6, to second pot 12, to third pot 4 is preferably located one above the other so it can gravity drain into the consecutive other pot. It is further preferred to locate the hot liquor tank 12 above the mash tun.

Figure 2:
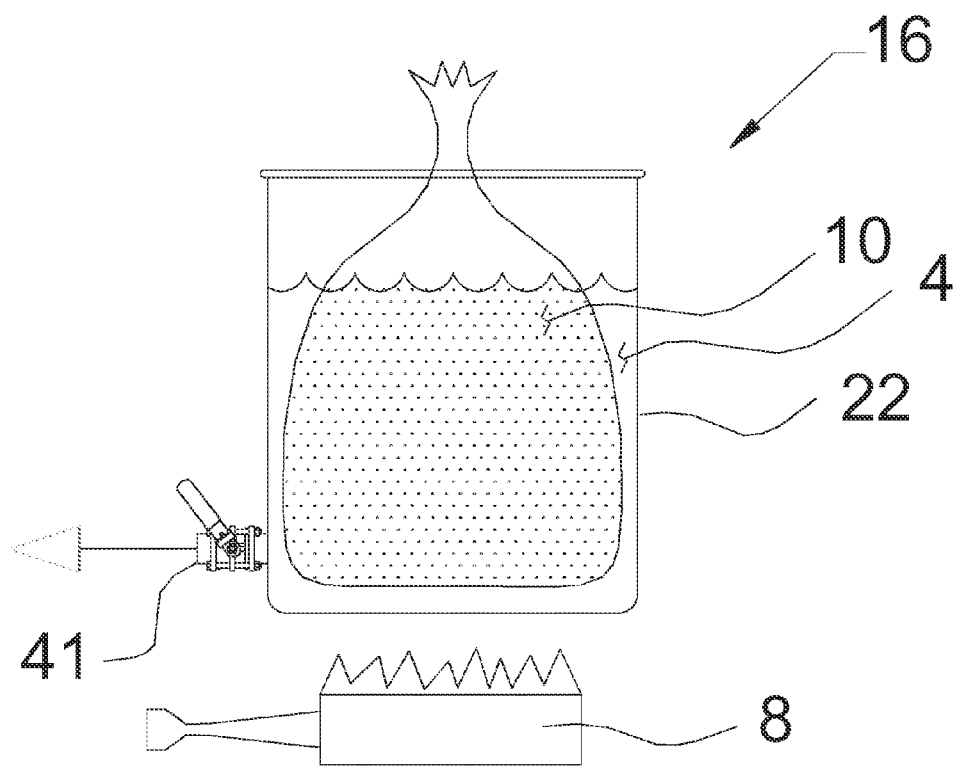
FIG. 2 is a prior art schematic view of the Brew in a Bag system of converting grain into wort.

In the prior art schematic of FIG. 2, a conventional Brew in a Bag system 16 is shown. In the conventional Brew in a Bag system 16 no sparging is performed and a mashing step 18 and boiling process 20 are done in a single vessel or pot 22.

Figure 3:
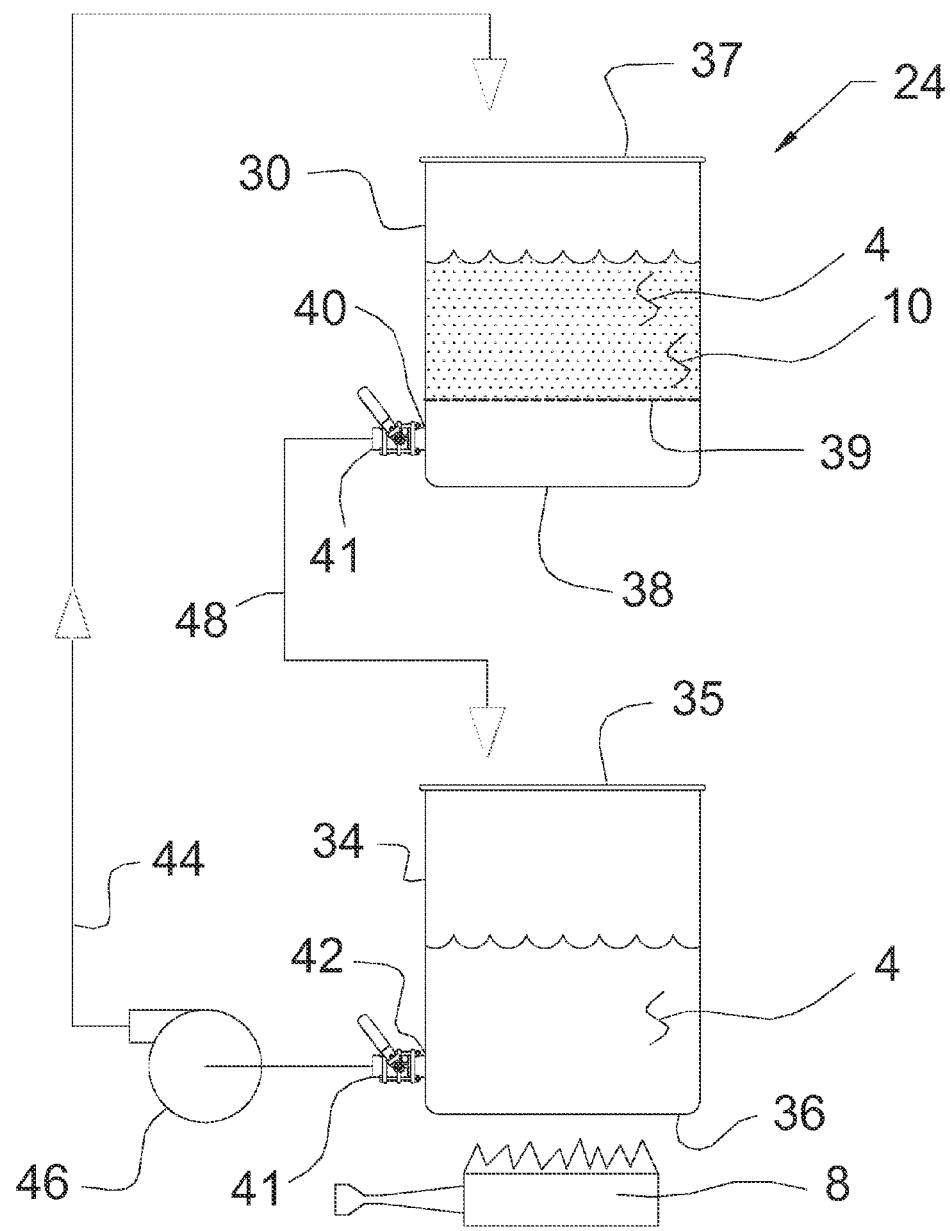
FIG. 3 is a schematic view of a two pot process including a first pot or boil kettle having a second pot or mash tun located elevationally above the boil kettle.

As shown in FIG. 3, the mashing process 24 of the present invention uses a two pot process and has a first pot or boil kettle 34 and a second pot or mash tun 30. In this configuration, the mash tun 30 is placed above the boil kettle 34. The boil kettle 34 has an open top 35 and a closed bottom 36 and the mash tun 30 has an open top 37 and a closed bottom 38. The mash tun 30 has the water 4 and the crushed grain 10 positioned therein, a false bottom or other filter system 39 (screens, slotted pipe manifold to name a few) and an outlet 40 positioned therein. In this application an on/off valve or modulating valve or on/off modulating valve 44 is positioned therein; however, other throttling devices such as a restrictive tube, orifice, pinch valve, variable flow pump etc. could be incorporated. The boil kettle 34 has the water 4 positioned therein and an outlet opening 42. In this application another on/off or modulating valve 41 is positioned in the outlet opening 42. A line 44 communicates from the outlet opening 42 in the boil kettle 34 to the mash tun 30. A pump 46 is located within this line 44. The pump 46 can be manually controlled or electronically controlled as is known in the art. The heating unit 8, in this application, is positioned under the boil kettle 34. A line 48 extends from the on/off or modulating valve 41 in the boil kettle 34 to the mash tun 30.

Figure 4:
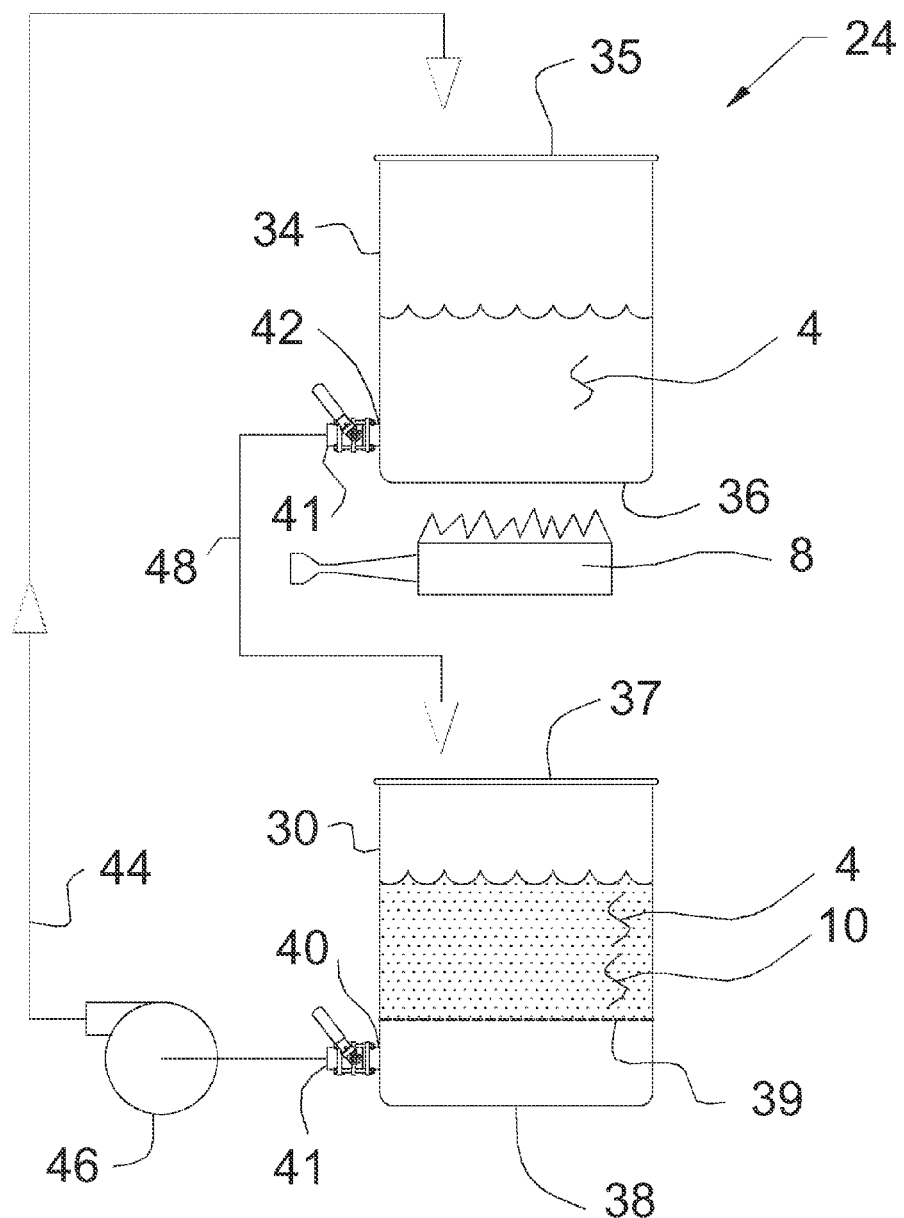
FIG. 4 is a schematic view of a two pot process including a first pot or boil kettle having a second pot or mash tun located elevationally below the boil kettle.

As shown in FIG. 4, the two pot mashing process 24 of the present invention has the boil kettle 34 and the mash tun 30 reversed. The boil kettle 34 is positioned above the mash tun 30. The heating unit 8 remains located under the boil kettle 34. However, the line 44 extends from the mash tun 30 to the boil kettle 34 and has the pump 46 therein. And, the line 48 extends from the on/off or modulating valve 41 in the boil kettle 34 to the mash tun 30. The heating unit 8 remains located under the boil kettle 34. The mash tun 30 has the water 4 and the crushed grain 10 positioned therein, the false bottom or other filter system 39 (screens, slotted pipe manifold to name a few) and the outlet 40 positioned therein. In this application the on/off or modulating valve 41 is positioned in the outlet opening 40; however, other throttling devices such as restrictive tubes, orifices, pinch valves, variable flow pumps etc. could be incorporated. The boil kettle 34 has the water 4 positioned therein and the outlet opening 42. In this application another on/off or modulating valve 41 is positioned in the outlet opening 42.

Figure 5:
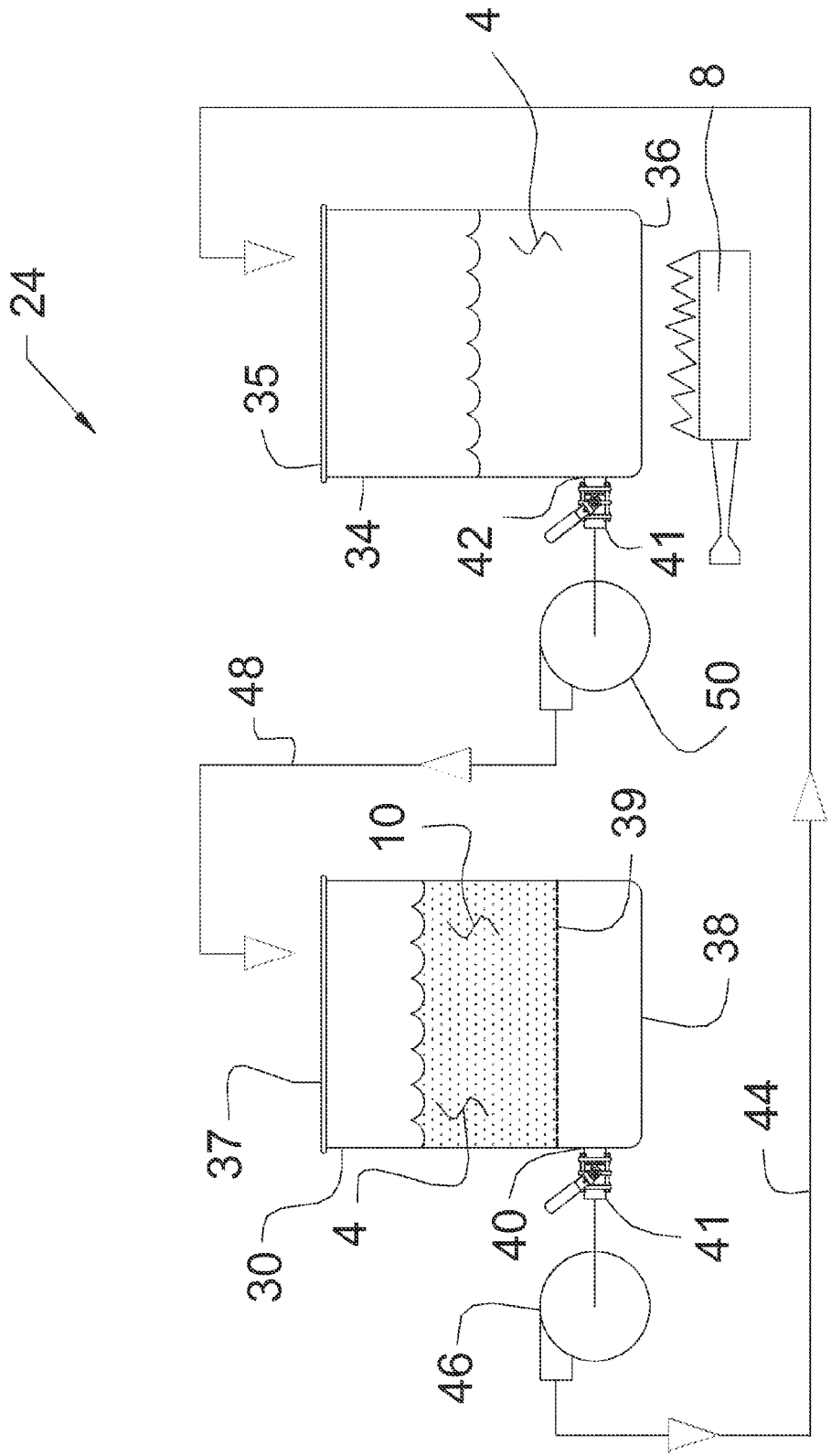
FIG. 5 is a schematic view of a two pot process including a first pot or boil kettle having a second pot or mash tun located substantially elevationally in the same plane.

As shown in FIG. 5, the two pot mashing process 24 of the present invention has the boil kettle 34 and the mash tun 30 elevationally located generally at a same elevation or in the same plane. The heating unit 8 remains located under the boil kettle 34. The line 44 extends from the on/off or modulating valve 41 positioned in the mash tun 30 to the boil kettle 34 and the pump 46 remains therein. The line 48 extends from the on/off or modulating valve 41 in the boil kettle 34 to the mash tun 30 and has a pump 50 positioned therein. The pump 50 can be manually controlled or electronically controlled as is known in the art. The mash tun 30 has the water 4 and the crushed grain 10 positioned therein, the false bottom or other filter system 39 (screens, slotted pipe manifold to name a few) and the outlet 40 positioned therein. In this application the on/off or modulating valve 41 is positioned in the outlet opening 40; however, other throttling devices such as restrictive tubes, orifices, pinch valves, variable flow pumps etc. could be incorporated. The boil kettle 34 has the water 4 positioned therein and the outlet opening 42. In this application another on/off or modulating valve 41 is positioned in the outlet opening 42.

Figure 6:
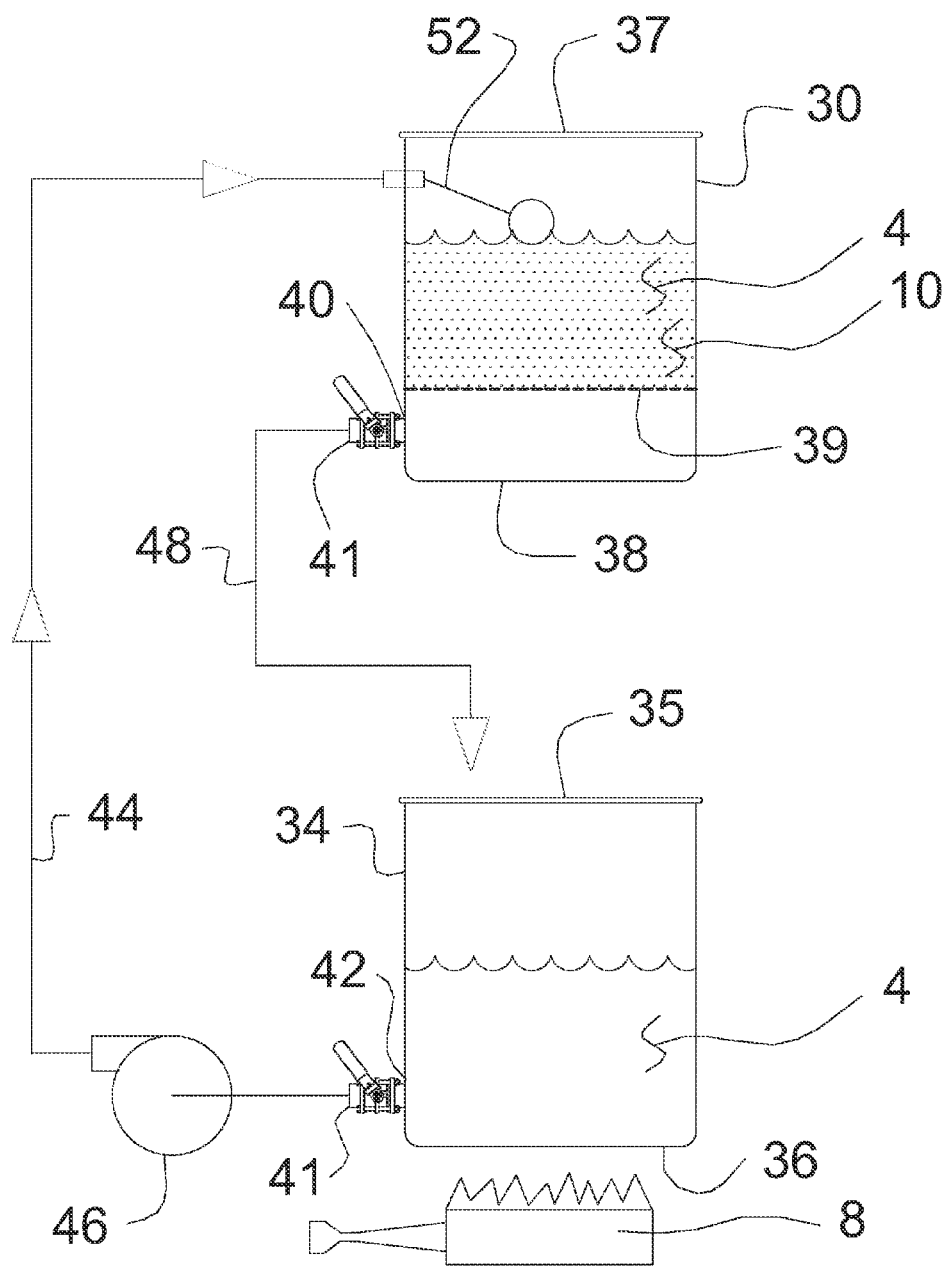
FIG. 6 is a schematic view of a two pot process including a first pot or boil kettle having a second pot or mash tun elevationally located above the first pot or boil kettle.

As shown in FIG. 6, the two pot mashing process 24 of the present invention has the first pot or boil kettle 34 and the second pot or mash tun 30. In this configuration, the mash tun 30 is placed above the boil kettle 34. The boil kettle 30 has an open top 35 and a closed bottom 36 and the boil kettle has an open top 37 and a closed bottom 38. The mash tun 30 has the water 4 and the crushed grain 10 positioned therein, the false bottom or other filter system 39 (screens, slotted pipe manifold to name a few) and the outlet 40 positioned therein. In this application the on/off or modulating valve 41 is positioned therein; however, other throttling devices such as a restrictive tube, orifice, pinch valve, variable flow pump etc. could be incorporated. The boil kettle 34 has the water 4 positioned therein and the outlet opening 42. In this application another on/off or modulating valve 41 is positioned in the outlet opening 42. The line 44 communicates from the outlet opening 42 in the boil kettle 34 to the mash tun 30. The pump 46 is located within this line 44. The pump 46 can be manually controlled or electronically controlled as is known in the art. The heating unit 8, in this application, is positioned under the boil kettle 34. The line 48 extends from the on/off or modulating valve 41 in the mesh tun 30 to the boil kettle 34. However; a level or float control valve 52 to monitor the height of the water 4 is positioned in the mash tun 30 below the open top 37 and above the closed bottom 38 of the mash tun 30.

Figure 7:
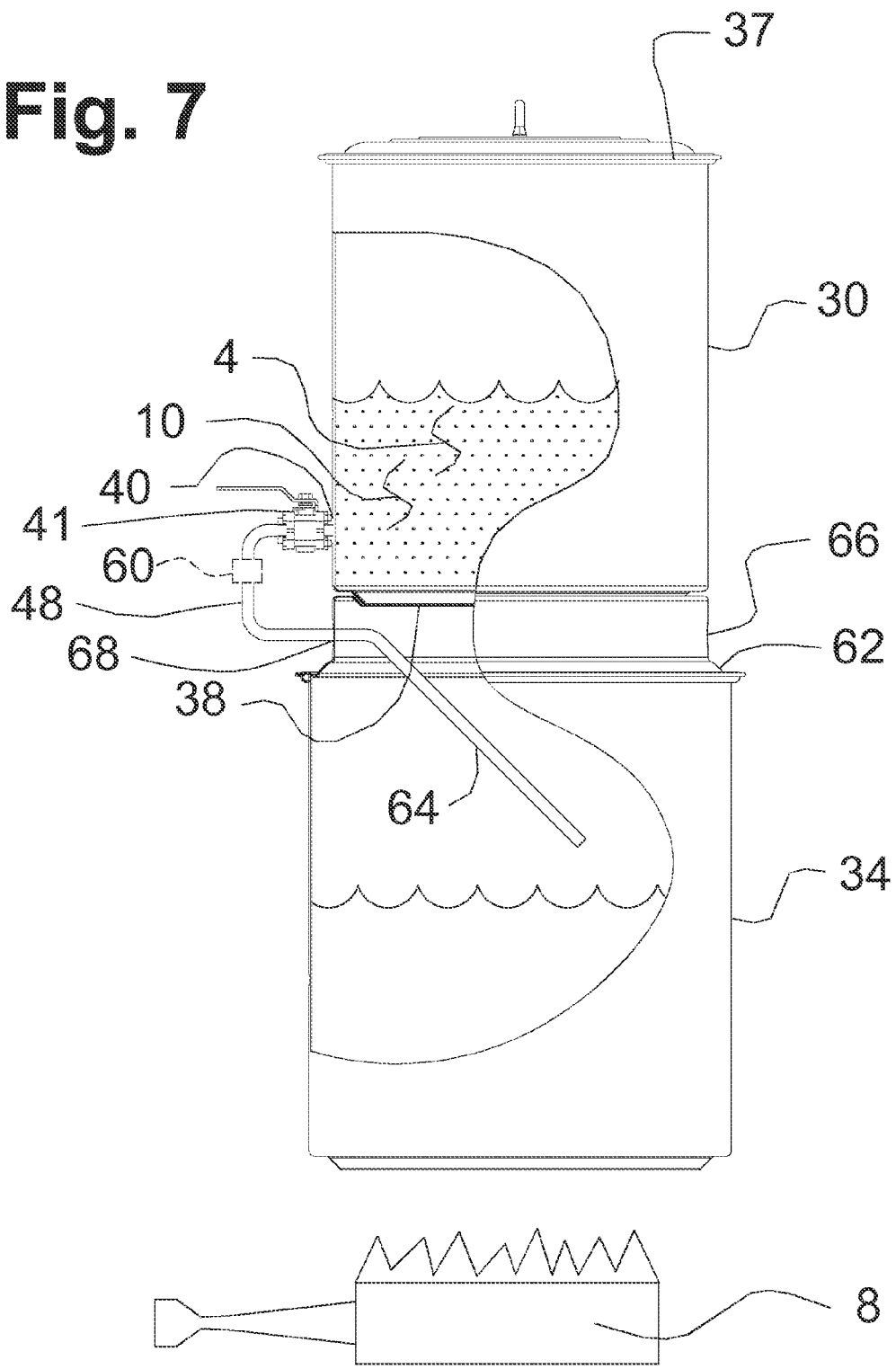
FIG. 7 is a schematic view of a two pot process including a first pot or boil kettle having a second pot or mash tun elevationally located above the first pot or boil kettle, and the second pot or mash tun being supported by the first pot or boil kettle.

As shown in FIG. 7, the mashing process 24 of the present invention again uses the two pot process and has the first pot or boil kettle 34 and the second pot or mash tun 30. In this configuration, the mash tun 30 is placed above the boil kettle 34. The boil kettle 30 has the open top 35 and the closed bottom 36 and the boil kettle has the open top 37 and the closed bottom 38. The mash tun 30 has the water 4 and the crushed grain 10 positioned therein, the false bottom or other filter system 39 (screens, slotted pipe manifold to name a few) and the outlet 40 positioned therein near the closed bottom 36. In this application the on/off or modulating valve 41 is positioned in the outlet 40; however, other throttling devices such as restrictive tubes, orifices, pinch valves, variable flow pumps etc. could be incorporated. The boil kettle 34 has the water 4 positioned therein however the outlet opening 42 has been removed. The heating unit 8, in this application, is positioned under the boil kettle 34. The line 48 extends from the on/off or modulating valve 41 in the mash tun 30 to the boil kettle 34. As an alternative, shown in phantom, a flow control mechanism 60 has been added to the line 48. A lid 62 and/or adapter lid 66 is positioned on the boil kettle 34 over the open top 35. The lid 62 and/or adapter lid 66 has an opening 64 positioned therein. The lid 62 and/or adapter lid 66 supports pots of different diameters and an adapter ring, not shown, is used to support pots of substantially the same diameter.

Figure 8:
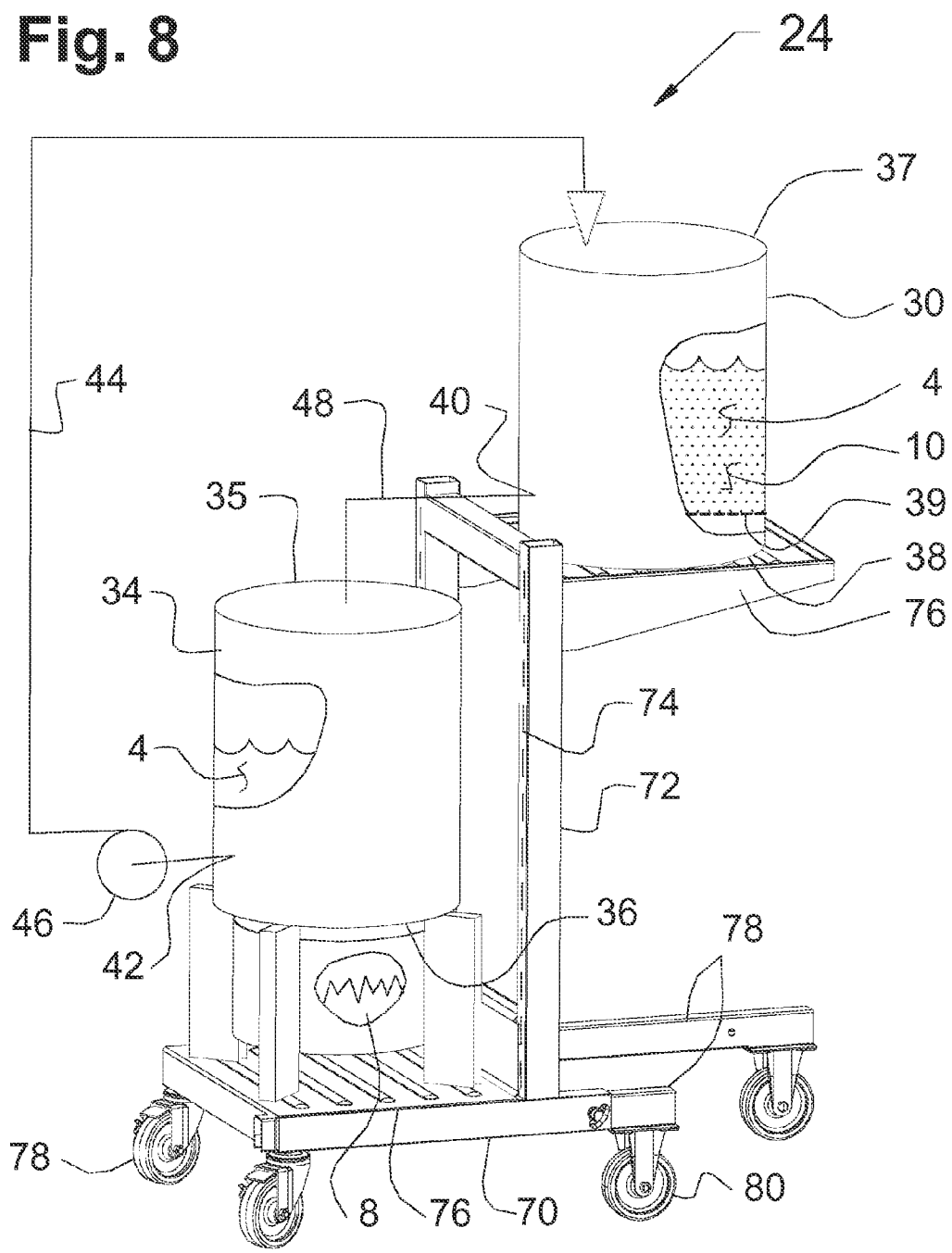
FIG. 8 is a schematic view of a two pot process including a first pot or boll kettle positioned on a stand and a second pot or mash tun being positioned on the stand and at an elevation above the first pot or boil kettle, and the first pot or boil kettle and the second pot or mash tun being offset one from the other.

As shown in FIG. 8, the mashing process of the present invention used two pots. However, in this application, a stand 70 on which the mash tun 30 is positioned above the boil kettle 34 and supports each of the pots 30,34. The stand 70 has a pair of vertical uprights 72 having slotted holes 74 therein which position a plurality of shelves 76. Nested or sliding legs 78 are attached to the vertical uprights 76. And, a plurality of wheels or casters 80 are attached to the legs 78. In this configuration, the mash tun 30 is placed above the boil kettle 34. The boil kettle 30 has an open top 35 and a closed bottom 36 and the boil kettle has an open top 37 and a closed bottom 38. The mash tun 30 has the water 4 and the crushed grain 10 positioned therein, the false bottom or other filter system 39 (screens, slotted pipe manifold to name a few) and the outlet 40 positioned therein. The boil kettle 34 has the water 4 positioned therein and the outlet opening 42. In this application the on/off or modulating valve 41 is positioned in the outlet opening 42. The line 44 communicates from the outlet opening 42 in the boil kettle 34 to the mash tun 30. The pump 46 is located within this line 44. The pump 46 can be manually controlled or electronically controlled as is known in the art. The heating unit 8, in this application, is positioned under the boil kettle 34. The line 48 extends from the outlet 40 in the mash tun 30 to the boil kettle 34.

In all of the various configurations shown, temperature control systems can readily be adapted to the present invention by adding a temperature sensor to either pot (but preferable to heated pot) or even in the recirculation lines 44, 48 to sense the temperature of the wort. This information is utilized to turn on or modulate the heat source 8. Since a thin mash 10 is used, scorching risk of the wort sugars is significantly reduced.

Additionally a transfer mechanism such as a pan, bucket or an automated grant (a simple tank with an outlet) could be used in conjunction with or in place of the boil kettle 30 and can be utilized to allow the mash tun or pot or vessel 34 to be drained into the grant vial gravity and when the grant is full a switch activates a pump which transfers the wort from the grant into the second pot or vessel or mash tun 34.

INDUSTRIAL APPLICABILITY

In operation, as best shown in FIG. 3, the mashing process 24 of the present invention utilizes one less pot 14 than the conventional 3 tier system, but one additional pot 30 over the conventional the Brew in a Bag (BIAB) system. In the present invention or process a predetermined volume of water 4 is placed in one of the boil kettle 30 and a remainder of the water 4 is placed in the mash tun 34. In general, about half of the total water 4 needed for the brew is added to each pot 30, 34. It is recognized that this ratio can vary significantly without effecting the operation or outcome of the beer. Typically overall water 4 to grist ratios will be 2 3.5 quarts of water 4 per pound of grain 10 so the wort is much less concentrated and is at or close to the initial specific gravity of the beer. While less water 4 can certainly be used, it does reduce the mash lauter efficiency. One pot, the mash tun 34 is preferably located above the second pot, the boil kettle 30 so the mash tun 34 can gravity drain into the boil kettle 30. It is noted that the invention will also function with the boil kettle 30 above the mash tun 34 as shown in FIG. 4. For overflow prevention of the mash tun 30, it is advisable to size the mash tun 34 such that it will contain all the water 4 and grains 10 without overflowing should the upper pot 30 be inadvertently drained into the mash tun 34 from a malfunction or maladjustment of the wort flow equipment 41. If this gravity drain arrangement is not desired, a second pump 50 can be utilized and either pot 30, 34 can be located at virtually any level with respect to each other as shown in FIG. 5. This is particularly useful for very large pots where access to the top of the pot may be impeded or impractical due to the height. The recirculation pump 46 is turned on and heat is added (electric or gas heating applied to the bottom of the pot 34, gas and electric are the two most common with electric immersion, steam jacketing, induction heater etc, all possible) to boil kettle 34 to raise the temperature of both vessels 30, 34 to the desired temperature. The pump 46 is preferably continuously recirculating the wort and heat is added as needed to maintain a more even and equal temperature throughout the mash bed 10. However, it is also possible and advantageous to modulate the pump 46 flow as needed or desired. To maintain about half of the water 4 in each pot 30, 34 the drain valve 41 (or other throttling device such as a restrictive tube, orifice, pinch valve, variable flow pump etc.) and pump 41 must be adjusted so that the exit rate is balanced with the entrance rate. Alternately, as shown in phantom, item 60, in FIG. 7 and shown in FIG. 6, as item 52, one or two flow and/or level control valves 52,60 can be utilized to automatically maintain this balance. When the prescribed temperature of the water 4 is reached, the grain 10 is added to the mash tun 30. Alternately the grain 10 could be added first and then heated and recirculated; however, better results usually happen adding the grain 10 after heating the water 4 to the desired temperature. While the pump 46 may be intermittently turned on and off during the brewing process to distribute the heat, the pump 46 is preferably allowed to continuously recirculate. This continual recirculation sets the grain 10 filter bed much better thereby clarifying the wort during the entire mashing process. Since the wort is clarified concurrently during the mashing process. The need to vorlauf (recirculate) afterwards is eliminated and a significant time savings is realized. At the end of the prescribed mashing time the recirculating pump 46 is turned off and the drain valve 41 from the boil kettle 34 is closed. This allows all the wort from the mash tun 30 to drain (or is pumped in two pump systems) into the boil kettle 34. Concurrent with the draining process, the boil kettle 34 heater 8 is turned on (no longer modulated) and the wort currently in the boil kettle 34 and the wort entering from the mash tun 30 is heated to the boiling point. Since the wort is concurrently heated while the mash tun is being drained additional time savings are realized. The higher water to grist ratio that is typically used (higher than both the BIAB and the 3 tier system) allows a higher efficiency than the BAIB process since a more diluted (lower specific gravity) wort remains in the mash bed 10 after draining. The volume of wort absorbed by the grain 10 is virtually the same in either system; however, the present invention utilizes a thinner wort so the remaining absorbed liquid contains less total sugar. Therefore, the overall mash efficiency is significantly more efficient than a BIAB system and approaches that of a traditional 3 tier system. Although not required, further improvement in mash 10 efficiency can be had by a slower draining time of the mash 10 into the boil kettle 34. This allows more wort to drain from the mash tun 30 and does not add significant time to the overall process since the boil kettle 34 takes time to heat to a boil and this being done concurrently with the draining.

As shown in FIG. 7, the two pot process of mashing grain 10 has the first pot or boil kettle 34 positioned on the bottom and the second pot or mash tun 30 position directly above the boil kettle 34. The lid 62 and/or adapter lid 66 is positioned about the open end 35 of the boil kettle 34. And, the mash tun 30 is positioned on the lid 62 and/or adapter lid 66. Thus, in this embodiment an extremely compact and cost effective system, particularly attractive to brewers with limited brewing space is provided. The wort from the upper pot 30 is drained into the lower pot 34. While the opening 64 could be placed in the lower pot, (and the upper support being as simple as a flat sheet) it is preferred to leave kettle 34 without openings to prevent overflow during the boiling process. Although not necessary to the basic function of the invention, a flow setting orifice 60 can be placed in the drain tube, as shown in phantom, to simplify setting the desired flow rate to avoid compaction from flowing too quickly and allowing a more repeatable flow rate from batch to batch. While the orifice 60 is clearly optional, it is preferred in lieu of throttling the valve 41 manually since setting the valve 41 batch to batch can be quite variable. Using the orifice 60, the valve 41 can then solely be used to turn the flow on or off. After the mash process is completed as describer previously, the wort is allowed to drain into the boil kettle 34. Simultaneously the boil kettle heat can be turned up to bring the wort to a boil. After the wort has been drained, the spent grains 10 can be removed from the mash tun 30 and the mash tun 34 subsequently removed from the boil kettle 34. Typically this is finished well before the wort in the brew kettle 34 has reached a boil so no time is added for draining and grain removal. The wort is then further processed in the boil kettle 34 as any other brewing process.

Another alternative is shown in FIG. 8, the stand 70 allows a compact, portable, and versatile way to perform the aforementioned two pot process. Since the shelves 76 can be installed in any desired position, on either side of the vertical upright 72. The lower shelf 76 may also be positioned in any desired position and on either side of the stand 70. Optionally, nested or sliding legs 78 can be utilized to provide anti tipping capability so that the upper shelf 76 can be installed on the opposite side, yet be retracted for compact storage. This feature is particularly useful in apartments or small structures. In operation the upper pot 30 is preferably the mash tun 30, although it can be configured so that it is the boil kettle 34 on the upper shelf 76 as shown previously in FIG. 4. While the stand 70 can be operated with the upper pot 30 directly over the lower pot 34 as shown in FIG. 7, it is more convenient to have access to the lower pot 34 for monitoring. While the upper pot 30 can be placed high enough over the lower pot 34 to gain access to the lower pot 34 it does increase the overall height of the product making it harder to add and remove grain 10 etc. But it does eliminate the need to fully extend the legs 78 allowing the stand 70 to fit into a smaller location. Typically, through, it is preferred to extend the legs 78 (which provide a tipping counterbalance force) and install the upper pot 30 on the opposite side of the stand 70 as shown in FIG. 8. This will allow for a much lower overall operational height, and yet for storage after use, it remains compact since the shelf 76 can be quickly moved to the opposite side of the stand 70.

This is particularly advantageous for brewers living in apartments or having other storage or operational space limitations.

The present invention overcomes the deficiencies of the "Brew in a Bag" (BIAB) system by allowing wort clarification through recirculation and improved efficiency since a thinner mash is used. In addition, the process time is virtually identical to that of the BIAB system and much faster than the 3 tier fly sparge system since the sparging process is eliminated. It also eliminates the unsafe and inconvenient removal of the hot bag of spent grain 10. The present invention also provides a compact system for space conscience brewers by eliminating a third ($3^{rd}$) pot required in a 3 tier system. Lastly, the present invention will easily accommodate step mashing and automated temperature control systems that are difficult and impractical in BIAB systems.

LIST OF ELEMENTS

Title: Improved Recirculation Infusion Mash System

File: Improved Recirculation Infusion Mash System—Easybrew 2 3 Tier System
4 Water
6 Mash Pot
8 heating Unit
10 Grain
12 Hot Liquor Tank
14 Third Pot
16 Brew in a Bag
18 Mashing Step
20 Boiling Process
22 Single Vessel or Pot
24 Mashing Process
26
28
30 Second Pot or Mash Tun
32
34 First Pot or Boil Kettle
35 Open Top—Boil Kettle
36 Closed Bottom—Boil Kettle
37 Open Top—Mash Tun
38 Closed Bottom Mash Tun
40 Outlet—Mash Tun
41 Valve
42 Outlet Opening Boil Kettle
44 Line—Drain Bottom to Top
46 Pump—Line 44
48 line—Drain Top to Bottom
50 Pump—Line 48
52 Level or Float Control Valve
54
56
58
60 Float Control Mechanism
62 Lid
64 Opening Lid
66
68
70 Stand
72 Upright
74 Slotted Holes
76 Shelves
78 Legs
80 Wheels or Casters
82
84
86

What is claimed is:

1. A two pot system for mashing grain into fermentable sugars comprising:
   (a) a first pot that is a mash tun including a top, a filter system, an outlet having a throttling device;
   (b) a second pot that is a boil kettle including an open top and an outlet opening having a valve, the boil kettle configured to be in contact with a removable lid;
   (c) a drain line in plumbing communication from the mash tun's outlet to the boil kettle having a flow control mechanism being positioned therein;
   (d) a recirculation line in plumbing communication from the boil kettle's outlet opening to the mash tun top; and
   (e) a heating source transferring heat to the boil kettle.

2. The two pot system for mashing grain into fermentable sugar of claim 1 further comprising a stand configured to support both the mash tun and the boil kettle having a plurality of shelves.

3. The two pot system for mashing grain into fermentable sugar of claim 2 wherein the plurality of shelves are generally oriented in the same horizontal plane.

4. The two pot system for mashing grain into fermentable sugar of claim 2 wherein the plurality of shelves are generally oriented such that a first shelf is higher than a second shelf.

5. The two pot system for mashing grain into fermentable sugar of claim 2 wherein the stand includes a plurality of casters attached to a plurality of legs.

6. The two pot system for mashing grain into fermentable sugar of claim 1 further comprising a recirculation pump in the recirculation line.

7. The two pot system for mashing grain into fermentable sugar of claim 4 further comprising two pumps.

8. The two pot system for mashing grain into fermentable sugar of claim 2 wherein the pump includes an electronic controller.

9. The two pot system for mashing grain into fermentable sugar of claim 1 wherein the filter system includes a false bottom.

10. A two pot system for mashing grain into fermentable sugars, comprising:
    (a) a first pot that is a mash tun having (i) a closed bottom and (ii) a filter system;
    (b) a second pot that is a boil kettle; said boil kettle having (i) an open top and (ii) a closed bottom, the boil kettle configured to be in contact with a removable lid;
    (c) a drain line communicating from said mash tun near the closed bottom of the mash tun into said boil kettle;
    (d) a flow control mechanism positioned in said drain line; and
    (e) a heating unit transferring heat to said boil kettle.

11. The two pot system for mashing grain into fermentable sugar of claim 10 further comprising a stand configured to support both the mash tun and the boil kettle having a plurality of shelves.

12. The two pot system for mashing grain into fermentable sugar of claim 11 wherein the plurality of shelves are generally oriented in the same horizontal plane.

13. The two pot system for mashing grain into fermentable sugar of claim 11 wherein the plurality of shelves are generally oriented such that a first shelf is higher than a second shelf.

14. The two pot system for mashing grain into fermentable sugar of claim 11 wherein the stand includes a plurality of casters attached to a plurality of legs.

15. The two pot system for mashing grain into fermentable sugar of claim 10 further comprising a recirculation line.

16. The two pot system for mashing grain into fermentable sugar of claim 15 further comprising a recirculation pump.

17. The two pot system for mashing grain into fermentable sugar of claim 16 wherein the pump includes an electronic controller.

18. The two pot system for mashing grain into fermentable sugar of claim 10 wherein said drain line is connected to a valve being positioned in an outlet of the mash tun.

19. The two pot system of claim 10 wherein the filter system includes a false bottom.

20. A two pot system for mashing grain into fermentable sugars comprising:

(a) a first pot that is a mash tun including a top, a filter system having a false bottom, an outlet having a throttling device;
(b) a second pot that is a boil kettle including an open top and an outlet opening having a valve, the boil kettle configured to be in contact with a removable lid;
(c) a drain line in plumbing communication from the mash tun's outlet to the boil kettle having a flow control mechanism being positioned therein;
(d) a recirculation line in plumbing communication from the boil kettle's outlet opening to the mash tun top, the recirculation line including a recirculation pump;
(e) a heating source associated with the boil kettle; and
(f) a stand configured to support both the mash tun and the boil kettle having a plurality of shelves, the stand including a plurality of casters attached to a plurality of legs.

* * * * *